and monovalent hydrocarbon radicals, which comprises contacting the diene with a catalyst consisting essentially of a carbonyl nitrosyl of a metal of Group VIII of the Periodic Table.

2. A process according to claim 1 which is effected in the substantial absence of oxygen.

3. A process according to claim 1 in which the metal carbonyl nitrosyl is iron dicarbonyl dinitrosyl.

4. A process according to claim 1 in which the metal carbonyl nitrosyl is used in an amount of from 0.01 to 10 parts per 100 parts of diene by weight.

5. A process according to claim 4 in which the metal carbonyl nitrosyl is used in an amount of from 0.1 to 2 parts per 100 parts of diene by weight.

6. A process according to claim 1 in which the diene is butadiene.

7. A process according to claim 6 which is affected by heating the reaction mixture to 40° C. to 100° C.

8. A process according to claim 7 in which the reaction mixture is heated to 100° C. and allowed to attain a higher temperature by exothermic reaction before cooling.

9. A process according to claim 1 in which the diene is isoprene.

10. A process according to claim 9 which is effected at a temperature of from 60° C. to 120° C.

References Cited

UNITED STATES PATENTS

| 2,865,707 | 12/1958 | Hogsed | 260—439 |
| 3,377,397 | 4/1968 | Mayfield | 260—666 |

OTHER REFERENCES

Hieber et al.: Zeit. Anorg. Allgem. Chem. 321, pp. 94–106, 1963.

Hieber and Beck, Zeit. Naturforshung Bd. 13B, pp. 194–5, 1958.

DELBERT E. GANTZ, *Primary Examiner.*

V. D. O'KEEFE, *Assistant Examiner.*

U.S. Cl. X.R.

260—348, 439; 204—162

1/16 of an inch in diameter. The dropped particles are aged in oil overnight (about 16 hours), separated from the oil and aged in an ammonia solution at 95° C. for about three hours. The aged spherical particles are then partially water washed to remove at least a portion of the neutralization salts and dried. The particles are thereupon calcined at 600° C. for 4 hours in dry air to yield a catalyst support having an ABD of between 0.4 and 0.5.

About 350 cc. of the catalyst support is placed in a steam jacketed rotating vessel and 250 cc. of an impregnation solution containing HCl is added thereto. The impregnation solution contains about 8.4 cc. of concentrated HCl. The vessel is rotated until all the liquid solution is evaporated. The catalyst particles are then oxidized in the presence of HCl vapor to produce a finished catalyst containing about 0.75 weight percent chloride and about 5 weight percent mordenite type aluminosilicate. This catalyst is designated as catalyst A.

EXAMPLE II

A second batch of catalyst is made exactly the same as described in Example I except 20 grams of synthetic mordenite is used instead of 10 grams. This results in a finished catalyst being produced containing about 0.75 weight percent chloride and 10 weight percent mordenite. This catalyst is designated as catalyst B.

EXAMPLE III

Aluminum metal, having a purity of 99.99 weight percent is digested in hydrochloric acid to produce a sol having a weight ratio of Al/Cl of about 1.15 and a specific gravity of 1.3450. A dilute solution of HF is then added to the sol. An aqueous solution containing 28 weight percent HMT is made up and 700 cc. of the HMT solution is added to 700 cc. of the above related sol solution and thoroughly mixed to form a dropping solution. About 10 grams of the hydrogen form of synthetic mordenite in the form of a fine powder is added to an alumina sol and thoroughly dispersed therein.

The alumina sol containing the dispersed mordenite is passed through a vibrating dropping head and dropped in discrete particles into a forming oil maintained at 95° C. The rate of vibration and the volumetric flow of alumina sol is set to produce finished spherical particles of about 1/16 of an inch in diameter. The dropped particles are aged in oil overnight (about 16 hours), separated from the oil and aged in an ammonia solution at 95° C. for about three hours. The aged spherical particles are then water washed to remove neutralization salts and dried. The particles are thereupon calcined at 600° C. for 4 hours in dry air to yield a catalyst having an ABD of between 0.4 and 0.5, about 0.8 weight percent fluoride and about 5 weight percent mordenite type aluminosilicate. This catalyst was designated as catalyst C.

EXAMPLE IV

Another batch of catalyst is made exactly the same as described in Example I except the catalyst support is impregnated with an impregnation solution containing HBr added thereto instead of HCl. The catalyst particles are then oxidized in the presence of HBr vapor instead of HCl vapor so that the finished catalyst contains about 0.75 weight percent bromide and 5 weight percent mordenite. This catalyst is designated as catalyst D.

EXAMPLE V

The catalyst prepared according to Example I above and designated as catalyst A is utilized in an alkylation reaction to determine the alkylation activity of said catalyst. In this experiment, 100 grams of the catalyst prepared according to the method of Example I is placed in an appropriate apparatus which is provided with heating means. In the experiment, benzene and ethylene are charged separately to the alkylation reaction zone. The reactor is maintained at about 500 p.s.i.g. and 150° C. Substantially complete conversion of the ethylene is obtained. The product is analyzed for olefins using a mass spectrometer and it is found that the product comprises ethylbenzene, diethylbenzene, polyethylbenzenes and unreacted benzene.

Example VI

The catalyst prepared according to Example II and designated as catalyst B is utilized in the alkylation reaction zone, 100 grams of the finished catalyst being placed in the alkylation apparatus. In the experiment, benzene and ethylene are charged separately to the alkylation zone which is maintained at about 500 p.s.i.g. and 125° C. Based on weight, substantially complete corversion of the ethylene is obtained. The product is analyzed for olefins using a mass spectrometer and it is found that the product comprises ethylbenzene, diethylbenzene, polyethylbenzenes and unreacted benzene.

Example VII

The catalyst prepared according to Example III and designated as catalyst C is utilized in an alkylation reaction, 100 grams of the finished catalyst being placed in the alkylation apparatus. In the experiment, benzene and propylene are charged separately to the alkylation zone. The reactor is maintained at about 400 p.s.i.g. and 175° C. Substantially complete conversion of the propylene is obtained. The product is analyzed for olefins using a mass spectrometer and it is found that the product comprises cumene, diisopropylbenzene, polypropylbenzenes and unreacted benzene.

Example VIII

The catalyst prepared according to Example IV above and designated as catalyst D is utilized in an alkylation reaction to determine the alkylation activity of said catalyst. In this experiment, 100 grams of the catalyst prepared according to the method of Example IV is placed in the alkylation apparatus. In the experiment, benzene and ethylene are charged separately to the alkylation reaction zone. The reactor is maintained at about 500 p.s.i.g. and 150° C. Substantially complete conversion of the ethylene is obtained. The product is analyzed for olefins using a mass spectrometer and it is found that the product comprises ethylbenzene, diethylbenzene, polyethylbenzenes and unreacted benzene.

Example IX

The catalyst prepared according to Example I above and designated as catalyst A is utilized in the alkylation of benzene with a synthetic refinery off-gas similar to that normally observed from a catalytic cracking unit. A fresh 100 gram batch of the catalyst is placed in an alkylation reactor and the reactor is maintained at a temperature in the range of from about 110° C. to about 215° C. at a pressure of about 600 p.s.i.g. The composition of the synthetic off-gas feed is as follows: carbon dioxide, 0.1 mol percent; nitrogen, 29.0 percent; carbon monoxide, 1.3 mol percent; hydrogen, 18.9 mol percent; methane, 35.0 mol percent; ethylene, 12.0 mol percent; ethane, 0.5 mol percent; propylene, 2.5 mol percent; propane, 0.1 mol percent; isobutane, 0.1 mol percent; and acetylene, 0.5 mol percent. The off-gas and benzene are charged separately to the alkylation zone. The plant effluent is tested for unsaturation and is found to have a low bromine index indicating the substantial absence of olefin polymerization products. The product comprises ethylbenzene, diethylbenzene, polyethylbenzenes, cumene, diisopropylbenzene, polypropylbenzenes and 1,1-diphenylethane.

I claim as my invention:

1. A conversion process which comprises alkylating an alkylatable aromatic compound with an olefin-acting compound at a temperature in the range of from about 0° to about 450° C. and at a pressure in the range of from about atmospheric to about 200 atmospheres in contact with a catalyst consisting essentially of a finely divided crystalline aluminosilicate suspended in an alumina matrix and at least one halogen selected from the group consisting of chlorine, bromine and fluorine combined therewith.

2. The process of claim 1 further characterized in that the crystalline aluminosilicate is in the hydrogen form and said halogen is present on the catalyst in concentrations as high as 3.0 percent by weight.

3. The process of claim 2 further characterized in that the crystalline aluminosilicate is a mordenite type.

4. The process of claim 3 further characterized in that the concentration of mordenite in the alumina matrix is less than 20 percent by weight, and the halogen is chlorine.

5. The process of claim 4 further characterized in that said alkylatable aromatic compound is an alkylatable benzene hydrocarbon.

6. The process of claim 4 further characterized in that said alkylatable aromatic compound is benzene.

7. The process of claim 4 further characterized in that said olefin-acting compound is an olefinic hydrocarbon.

8. The process of claim 4 further characterized in that said olefin-acting compound is a normally gaseous olefin.

9. The process of claim 8 further characterized in that said normally gaseous olefin is ethylene.

10. The process of claim 8 further characterized in that said normally gaseous olefin is propylene.

References Cited

UNITED STATES PATENTS

| | | | |
|---|---|---|---|
| 3,175,967 | 3/1965 | Miale et al. | 208—120 |
| 3,210,267 | 10/1965 | Plank et al. | 208—120 |
| 3,251,897 | 5/1966 | Wise | 260—671 |
| 3,277,018 | 10/1966 | Plank et al. | 260—671 X |

DELBERT E. GANTZ, *Primary Examiner.*

C. R. DAVIS, *Assistant Examiner.*